UNITED STATES PATENT OFFICE.

MICHAEL J. DAVIS, OF BROOKLYN, NEW YORK, ASSIGNOR, BY MESNE ASSIGNMENTS, OF ONE-HALF TO MATHEW MICOLINO, OF NEW YORK, N. Y.

EGG-PRESERVATIVE.

1,250,567.  Specification of Letters Patent.  Patented Dec. 18, 1917.

No Drawing.  Application filed June 2, 1915. Serial No. 31,663.

*To all whom it may concern:*

Be it known that I, MICHAEL J. DAVIS, a citizen of the United States, and resident of the borough of Brooklyn, county of Kings, city and State of New York, have invented certain new and useful Improvements in Egg-Preservatives, of which the following is a specification.

My invention relates to preservatives for eggs and has for its object to provide a solution adapted to be applied to the eggs as a coating to form what might be termed an artificial mother thereon and which is capable of hardening after being applied to the eggs and which by filling the pores of the egg shell and thus preventing all evaporation prevents decomposition thereof for an indefinite period of time. My improvement further contemplates a solution which is composed entirely of harmless ingredients, is not affected by moisture or the action of the atmosphere and which is capable of effectively resisting otherwise injurious temperatures. A further object of my invention is to provide a coating which is colorless and which does not change the natural appearance of the egg after it has been applied thereto. My improvement will be fully described hereinafter and the features of novelty will be pointed out in the appended claims.

My improved solution in its preferred form consists of a mixture of resin and an oil commonly known as East India, Chinese nut or tung oil. In order that this solution, after it has been applied to the eggs as a coating, may be certain to dry perfectly flat and without any appreciable luster or gloss and thus preserve the natural appearance of the egg shell I may include powdered magnesia or any other suitable substance which will have the effect of a flattener and which will not produce an effect antagonistic to the normal color of the egg shell.

In preparing the solution I take a predetermined amount of tung oil, say for instance eight gallons and heat it in a suitable vessel to approximately three hundred degrees for the purpose of oxidation. After the oil has reached this temperature a predetermined amount of resin, for instance approximately two pounds, preferably in a finely powdered condition is added to the hot oil and thoroughly stirred into same until the two ingredients become thoroughly mixed or in other words the resin is fully dissolved, after which the mixture is again heated. The mixture is then preferably placed in another vessel, for instance a mortar, and while it is cooling a predetermined amount of very finely powdered magnesia sufficient to eliminate any luster that may be caused by the resin and oil in each case is added to the mixture and thoroughly mixed therewith. The mixing action is continued until the ingredients have been thoroughly and equally mixed together and the product has assumed a more or less viscous condition.

After the mixture or coating has been fully prepared it is preferably stored in bottles or other closed vessels until required for use.

In using the coating I prefer to spread a small amount thereof upon the palms of the hands and then roll the egg between said palms until the surface of the shell has been entirely covered with the solution. In this way a film or coating of the solution is evenly spread over the surface of the egg shell and fills all the pores and a uniform result insured while at the same time waste of material is prevented. At the same time the action of the solution serves to unite the membrane or inner lining of the egg firmly to the shell. It will of course be understood that the above is only an example and that the coating may be otherwise applied to the egg if desired, the only requirement being that the surface of the shell must be completely covered with said solution, the method of application being immaterial. For instance the solution may be more readily applied by immersing the egg therein; in this case it is preferable, in order to facilitate the dipping, to thin the solution somewhat by adding some oil suitable for the purpose. After the egg has been treated as described it is placed aside to permit the coating to become hardened. As the mixture dries upon the egg, it destroys any bacteria that may be on the shell and causes the shell to become substantially impervious to moisture and proof against atmospheric conditions. The said coating owing to its viscous condition when being applied does not penetrate through the pores of the shell to the meat of the egg and in its final state forms a hard coating which covers or seals the outer ends of said pores and thus by preventing air from reaching the said meat of the egg absolutely prevents decomposition thereof. As said coating is substantially permanent it will be seen that eggs treated with my improved solution may be kept for an indefinite period of time and upon being used will be found in a thoroughly fresh and healthy condition. Eggs treated with my solution have been subjected to changes of temperature from as high as one hundred and fifty degrees Fahrenheit to the freezing point without causing any deterioration of the contents. At the same time in view of the fact that my improved coating when dry is substantially lusterless and of approximately the same appearance as the egg shell the presence thereof is not noticeable to the ordinary observer. All of the ingredients composing my improved solution are entirely harmless so that no injury would result even if the same should come into contact with the meat of the egg. My improved coating may be termed an artificial mother which in practice takes the place of the natural mother with which the egg is covered at the time same is laid and which natural mother disappears or becomes dissolved through atmospheric or other influences and thus permits decomposition of the egg. The said coating will also close or cover any cracks in the shell of the egg thus making it possible to preserve indefinitely eggs which have become checked or cracked.

While I have mentioned and prefer to use tung oil in combination with resin, the latter may be omitted if desired. The objects of adding resin to the oil, are, first, to thicken the oil and assist it in preserving; second, to more effectually close the pores of the egg shell; and third to avoid breaking of the egg when subjected to heat as in boiling.

It is to be further understood that the proportions given are only examples and that the same may be changed to meet the requirements of each specific case.

In some cases the magnesia or other flattener instead of being introduced into the mixture may be omitted therefrom and simply applied to the egg after the same has been coated with the solution and while the latter is still moist. It will be understood that generally speaking my improved solution will dry perfectly flat and without gloss, so as to be invisible, and that the use of a flattener is only required in isolated cases.

Various changes in the specific forms shown and described may be made within the scope of the claims without departing from the spirit of my invention.

I claim:

1. A solution composed of tung oil and resin for sealing and preserving eggs.

2. An improvement in the art of preserving eggs which consists in covering the shell thereof with tung oil.

3. The process of preserving eggs by rubbing tung oil over the entire outer surface of the egg.

4. The process of preserving eggs by rubbing a mixture of tung oil and resin over the entire surface of the egg-shell.

In testimony whereof I have hereunto set my hand in the presence of two subscribing witnesses.

MICHAEL J. DAVIS.

Witnesses:
JOHN A. KEHLENBECK,
FRED O. CALDER.